United States Patent [19]

Nishimura et al.

[11] Patent Number: 4,911,117
[45] Date of Patent: Mar. 27, 1990

[54] ARRANGEMENTS FOR SUPPORTING CRANKSHAFTS IN MULTICYLINDER ENGINES

[75] Inventors: Kazuaki Nishimura; Hiroichi Takubo; Toshinobu Itoh, all of Hiroshima, Japan

[73] Assignee: Mazda Motor Corporation, Hiroshima, Japan

[21] Appl. No.: 218,181

[22] Filed: Jul. 13, 1988

[30] Foreign Application Priority Data

Jul. 14, 1987 [JP] Japan .................. 62-176913
Jul. 15, 1987 [JP] Japan .................. 62-177730

[51] Int. Cl.$^4$ .............................................. F02F 7/00
[52] U.S. Cl. .............................. 123/195 R; 123/195 H
[58] Field of Search ........... 123/195 H, 195 R, 195 C, 123/198 E; 384/429, 432

[56] References Cited

U.S. PATENT DOCUMENTS

| | | | |
|---|---|---|---|
| 3,046,954 | 7/1962 | Hoffman | 123/195 H |
| 3,841,203 | 10/1974 | Bruce | 123/195 H |
| 4,445,472 | 5/1984 | Ogawa et al. | 123/195 E |
| 4,656,983 | 4/1987 | Anno | 123/195 H |
| 4,721,077 | 1/1988 | Fukuo et al. | 123/195 C |

Primary Examiner—Noah P. Kamen
Attorney, Agent, or Firm—Sixbey, Friedman, Leedom and Ferguson

[57] ABSTRACT

An arrangement for supporting a crankshaft in a multicylinder engien comprises a plurality of bulkheads provided in a cylinder block of the engine to be arranged at predetermined intervals along an axis of the crankshaft disposed in the cylinder block, a plurality of bearing caps each coupled with a lower end of one of the bulkheads by a cap bolt screwed into the bulkhead through a part of the bearing cap relatively close to the bulkhead so as to constitute a bearing portion for supporting the crankshaft in conjunction with the bulkhead, a beam structure extending along the axis of the crankshaft to interconnect therethrough adjacent two of the bearing caps, and a reinforcing structure coupled with the beam structure with a plurality of clamped spots generally arranged in the direction along which the crankshaft extends and also coupled with each of side skirt portions of the cylinder block with a plurality of clamped spots generally arranged in the direction along which the crankshaft extends.

16 Claims, 7 Drawing Sheets

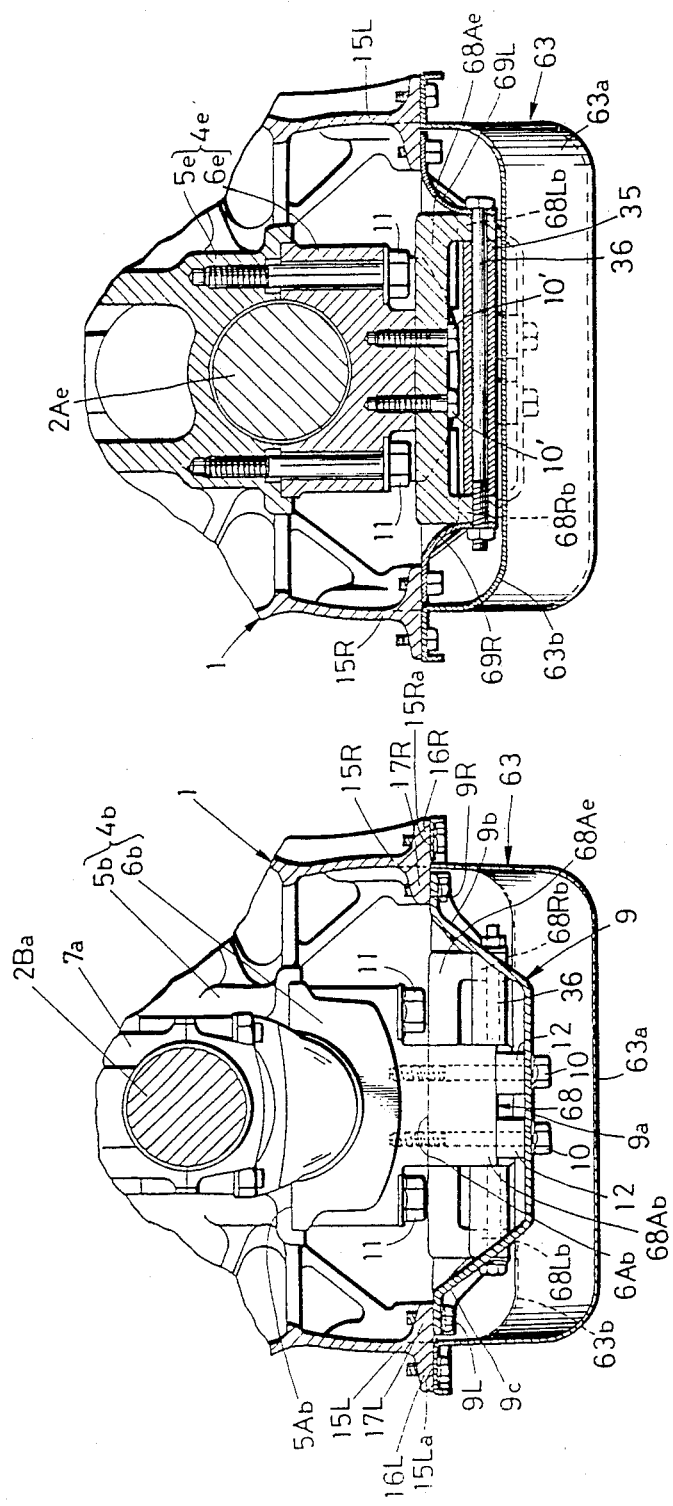

ARRANGEMENTS FOR SUPPORTING CRANKSHAFTS IN MULTICYLINDER ENGINES

BACKGROUND OF THE INVENTION

1. Field of the Invention

The present invention generally relates to structural arrangements for supporting crankshafts in multicylinder engines, and more particularly, is directed to improvements in an arrangement for supporting a crankshaft to be rotatable by a plurality of bearing portions in a cylinder block of a multicylinder engine.

2. Description of the Prior Art

A multicylinder engine which is an internal combustion engine of the multicylinder type is provided therein with a plurality of bulkheads for forming a supporting structure for a crankshaft, and it is generally required of the multicylinder engine to reduce vibrations of each bulkhead caused in a direction along which the crankshaft extends due to revolutions of the crankshaft and noise resulting from the vibrations of the bulkhead. For the purpose of causing the multicylinder engine to fulfill such a requirement, there has been proposed to interconnect bearing portions each provided on the bulkhead for supporting the crankshaft through, for example, beam members so as to increase rigidity of the supporting structure for the crankshaft in the direction along which the crankshaft extends, as disclosed in, for example, the Japanese patent application published before examination under publication number 57-99248 and he Japanese Utility model application published before examination under publication number 59-34049.

In the crankshaft supporting arrangement disclosed in the above mentioned published Japanese patent application, a pair of beam members are incorporated with a plurality of bearing caps, each of which constitutes a bearing portion for supporting the crankshaft in conjunction with the bulkhead, and disposed to extend along the crankshaft at right and left lower side positions in the multicylinder engine, respectively. In the case of this arrangement, each adjacent two of the bearing caps are interconnected through each beam member and therefore each of the bulkheads, with which the bearing cap is coupled to form the bearing portion for supporting the crankshaft, is restrained from vibrating during revolution of the crankshaft. However, since each of the bearing caps is made large in size to keep the beam members sufficiently apart from the crankshaft so that the beam members are positioned at the outside of a space necessary for the revolution of the crankshaft, each of cap bolts used for clamping the bearing cap to the corresponding bulkhead is required to be made long and therefore it is difficult for the bearing cap to be coupled rigidly enough with the bulkhead.

Further, in the crankshaft supporting arrangement disclosed in the above mentioned published Japanese utility model application, each of the bearing caps constituting the bearing portion for supporting the crankshaft in conjunction with the bulkhead is coupled with a connecting plate member which is provided for interconnecting therethrough right and left side skirt portions of the cylinder block of the multicylinder engine, so that the connecting plate member is used as a beam member interconnecting therethrough the bearing caps. In the case of this arrangement, each adjacent two of the bearing caps are interconnected through a portion of the connecting plate member and therefore each of the bulkheads, with which the bearing cap is coupled to form the bearing portion for supporting the crankshaft, is restrained from vibrating during revolution of the crankshaft. However, since each of connecting bolts for fixing the connecting plate member to the bulkhead is also used as the cap bolt for clamping the bearing cap, which is positioned between the bulkhead and the connecting plate member, to the bulkhead, each of cap bolts, that is, each of the connecting bolts is required to be made long and therefore the bearing cap can not be coupled rigidly enough with the bulkhead also in this case.

OBJECTS AND SUMMARY OF THE INVENTION

Accordingly, it is an object of the present invention to provide an arrangement for supporting a crankshaft in a multicylinder engine, which avoids the aforementioned disadvantages or problems encountered with the prior art.

Another object of the present invention is to provide an arrangement for supporting a crankshaft in a multicylinder engine, by which bearing portions each formed by a bulkhead and a bearing cap coupled with each other for supporting a crankshaft are interconnected through a beam member extending in a direction along which the crankshaft extends and each bearing cap is coupled with the corresponding bulkhead with sufficient rigidity.

A further object of the present invention is to provide an arrangement for supporting a crankshaft in a multicylinder engine, by which bearing portions each formed by a bulkhead and a bearing cap coupled with each other for supporting a crankshaft are interconnected through a beam member extending in a direction along which the crankshaft extends, each bearing cap is coupled with the corresponding bulkhead with sufficient rigidity, and further vibrations of side skirt portions of a cylinder block of the engine is suppressed effectively with a relatively simple supporting configuration.

According to the present invention, there is provided an arrangement for supporting a crankshaft in a multicylinder engine, which comprises a plurality of bulkheads provided in a cylinder block of the engine to be arranged at predetermined intervals along an axis of the crankshaft disposed in a lower part of the cylinder block, plurality of bearing caps each coupled with a lower end of one of the bulkheads by a cap bolt screwed into the bulkhead through a part of the bearing cap relatively close to the bulkhead so as to constitute a bearing portion for supporting the crankshaft in conjunction with the bulkhead, a beam structure extending along the axis of the crankshaft to interconnect therethrough adjacent two of the bearing caps, and a reinforcing structure coupled with the beam structure with a plurality of clamped spots generally arranged in the direction along which the crankshaft extends and also coupled with each of side skirt potions of the cylinder block with a plurality of clamped spots generally arranged in the direction along which the crankshaft extends.

With the arrangement thus constituted in accordance with the present invention, since the bearing caps are connected with or incorporated with the beam structure extending along the axis of the crankshaft and the beam structure is connected through the reinforcing structure with the side skirt portions of the cylinder block, the bearing portions each constituted by the bulkhead and the bearing cap to support the crankshaft are improved in rigidity in a direction along which the crankshaft extends and improved also in rigidity in a direction of twisting distortion of the crankshaft. The cap bolt which is screwed into the bulkhead through the part of the bearing cap relatively close to the bulkhead for clamping the bearing cap to the bulkhead can be mad relatively short, and therefore each of the bearing caps can be coupled with the corresponding bulkhead with sufficient rigidity. Further, since the side skirt portions of the cylinder block are coupled through the reinforcing structure with the beam structure, undesirable vibrations of each of the side skirt portions are suppressed effectively.

The above, and other objects, features and advantages of the present invention will become apparent from the following detailed description which is to be read in conjunction with the accompanying drawings.

BRIEF DESCRIPTION OF THE DRAWINGS

FIGS. 5, 6 and 7 are schematic cross-sectional views each showing a further embodiment of arrangement for supporting a crankshaft in a multicylinder engine according to the present invention, together with a part of an engine to which the embodiment is applied.

DESCRIPTION OF THE PREFERRED EMBODIMENTS

Figure 1:
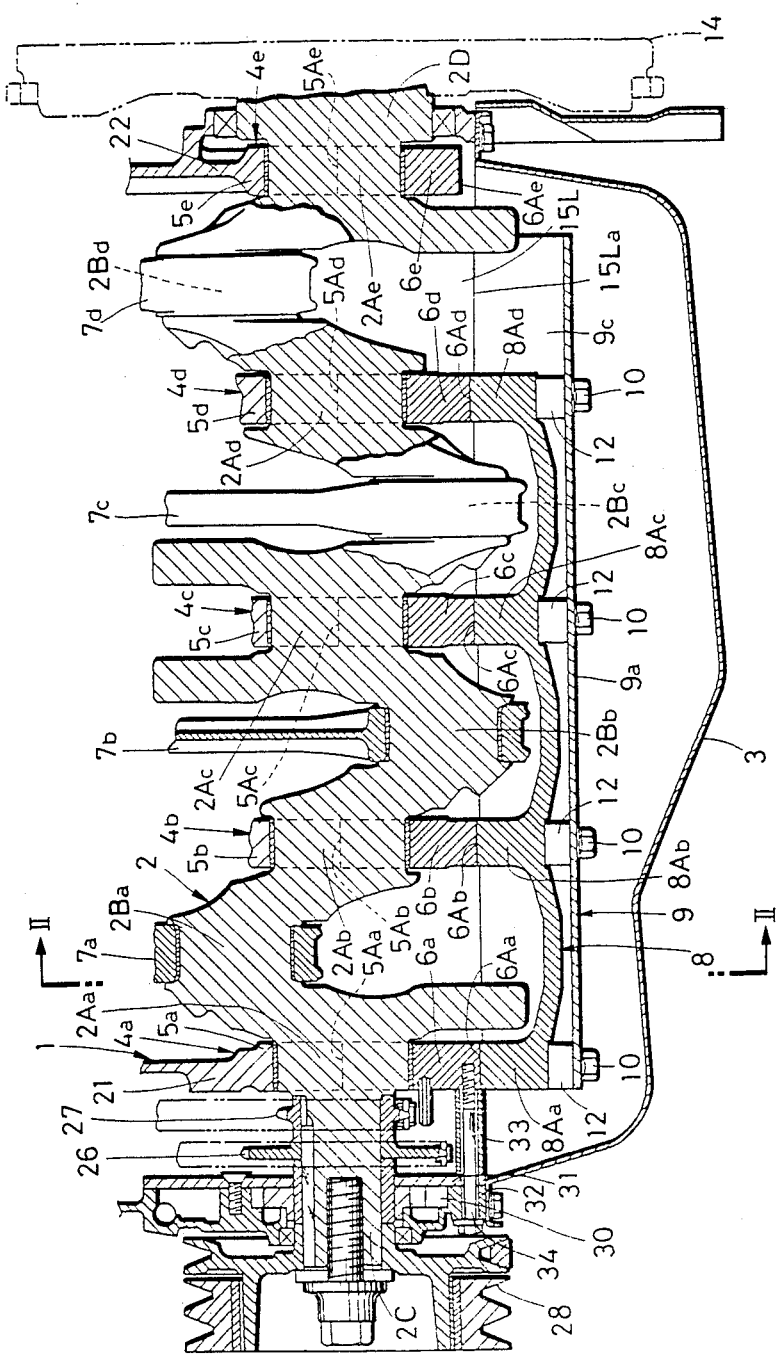
FIGS. 1 and 2 are schematic cross-sectional views each showing one embodiment of arrangement for supporting a crankshaft in a multicylinder engine according to the present invention, together with a part of an engine to which the embodiment is applied.
Figure 2:
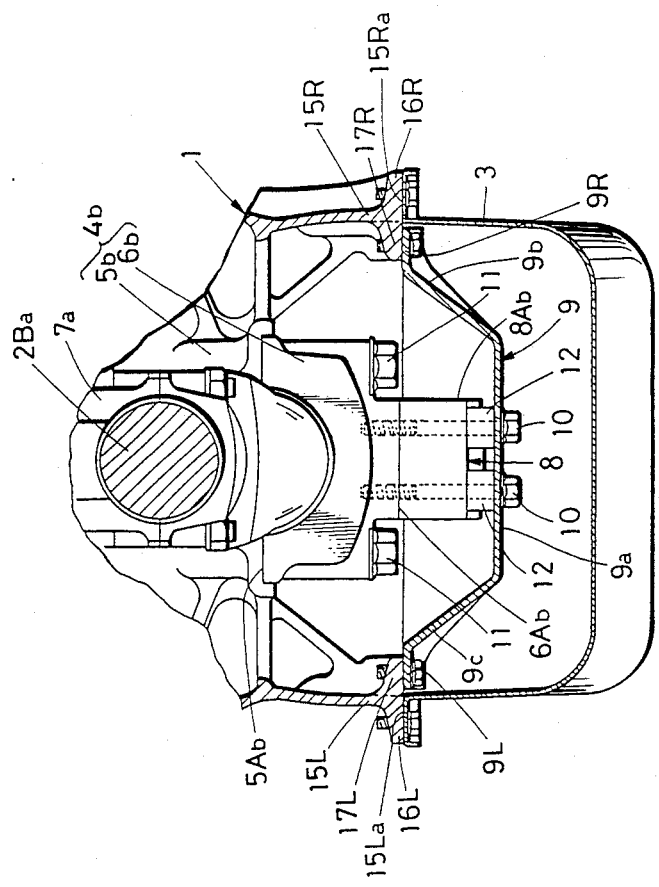

FIGS. 1 and 2 show one embodiment of arrangement for supporting a crankshaft in a multicylinder engine according to the present invention, which is applied to an engine having four cylinders arranged in line. FIG. 2 is a cross-sectional view taken on lines II—II in FIG. 1.

The engine shown in FIGS. 1 and 2 comprises a cylinder block 1 having right and left skirt portions 15R and 15L, a crankshaft 2 disposed in a lower part of the cylinder block 2 to extend generally along each of the right and left side skirt portions 15R and 15L, and an oil pan 3 coupled with outer mounting fringes 16R and 16L provided at lower ends of the right and left side skirt portions 15R and 15L. The crankshaft 2 is provided with five journals 2Aa, 2Ab, 2Ac, 2Ad and 2Ae formed at predetermined intervals and four crank pins 2Ba, 2Bb, 2Bc and 2Bd each positioned between each adjacent two of the journals 2Aa to 2Ae, and connecting rods 7a, 7b, 7c and 7d are mounted rotatably on the crank pins 2Ba to 2Bd, respectively. On a front end portion 2C of the crankshaft 2 projected through a front wall 21 of the cylinder block 1 to the outside of the same, sprockets 26 and 27, a pulley structure 28 and a oil pump 30 are mounted. Further, a flywheel 14 is mounted on a rear end portion 2D of the crankshaft 2 projecting through a rear wall 22 of the cylinder block 1 to the outside of the same.

The cylinder block 1 is provided with bulkheads 5a, 5b, 5c, 5d and 5e arranged at predetermined intervals along an axis of the crankshaft 2, and bearing caps 6a, 6b, 6c, 6d and 6e are connected with lower ends 5Aa, 5Ab, 5Ac, 5Ad and 5Ae of the bulkheads 5a to 5e, respectively, to constitute bearing portions 4a, 4b, 4c, 4d and 4e by which the journals 2Aa to 2e of the crankshaft 2 are respectively supported to be rotatable. Each of combinations of the bulkhead 5a and the bearing cap 6a, the bulkhead 5b and the bearing cap 6b, the bulkhead 5c and the bearing cap 6c, the bulkhead 5d and the bearing cap 6d, and the bulkhead 5e and the bearing cap 6e, is clamped by a pair of cap bolts 11 each screwed into each of the bulkheads 5a to 5e through a part of each of the bearing caps 6a to 6e relatively close to the each of the bulkheads 5a to 5e, as shown in FIG. 1.

The bearing caps 6a to 6e are so formed as to have respectively lower ends 6Aa, 6Ab, 6Ac, 6Ad and 6Ae each positioned not to project downward from lower end faces 15Ra and 15La of the right and left side skirt portions 15R and 15L. Accordingly, when an engine block which comprises the cylinder block 1 provided with the crankshaft 2 supported by the bearing portions 4a to 4e which are formed by the bulkheads 5a to 5e and the bearing caps 6a to 6e coupled respectively with the bulkheads 5a to 5e, is transported, the cylinder block 1 can be placed stably on a flat carrying palette so as to cause the lower end faces 15Ra and 15La of the right and left side skirt portions 15R and 15L to come into contact directly with a surface of the carrying palette. This results in an advantage that the engine block can be easily transported without needing such a specific carrying palette as used for transporting an engine block which is provided with bearing caps each having a lower end thereof projecting downward from lower ends of side skirt portions of a cylinder block.

In addition to the above configuration, a beam member 8 which extends along the axis of the crankshaft 2 and is provided with four connecting projections 8Aa, 8Ab, 8Ac and 8Ad formed to project upward at intervals corresponding to those of the bearing portions 4a to 4d, is attached to the bearing cap 6a to 6d, which are coupled respectively with the lower ends 5Aa to 5Ad of the bulkheads 5a to 5d, in such a manner that the connecting projections 8Aa to 8Ad are connected respectively with the lower ends 6Aa to 6Ad of the bearing caps 6a to 6d and each of the connecting projections 8Aa to 8Ad is positioned under a portion of each of the bearing caps 6a to 6d between the cap bolts 10. Further, a reinforcing plate member 9 is attached to the right and left side skirt portions 15R and 15L of the cylinder block 1 to be positioned under the bearing portions 4a to 4e. The reinforcing plate member 9 is shaped to protrude downward so as to be positioned at the outside of a revolution space of the crankshaft 2.

Right and left fringes 9R and 9L of the reinforcing plate member 9 extending along the right and left side skirts portions 15R and 15L respectively are coupled with inner mounting fringes 17R and 17L provided at he lower ends of the right and left side skirt portions 15R and 15L by a plurality of bolts forming clamping spots arranged along the right and left fringes 9R and 9L, as shown in FIG. 2, and a central portion 9a of the reinforcing plate member 9 which is placed between slant side wall portions 9b and 9c of the reinforcing plate member 9 each positioned at the outside of the cap bolts 11, as shown in FIG. 2, and extends along the beam member 8 is attached through a plurality of spacers 12 to the under surface of the beam member 8 which is attached to the bearing caps 6a to 6d. Each of combinations of the bearing cap 6a and the connecting projection 8Aa of the beam member 8, the bearing cap 6b and the connecting projection 8Ab of the beam member 8, the bearing cap 6c and the connecting projection 8Ac of the beam member 8, and the bearing cap 6d and the connecting projection 8Ad of the beam member 8, is clamped by a pair of clamping bolts 10 each screwed into each of the bearing caps 6a to 6d through the central portion 9a of the reinforcing plate member 9, the spacer 12 and each of the connecting projections 8Aa to 8Ad of the beam member 8. Accordingly, the central portion 9a of the reinforcing plate member 9 is coupled with the beam member 8 with a plurality of clamping spots formed by the clamping bolts 10 to be arranged along the beam member 8.

In the embodiment constituted as mentioned above, since the bearing caps 6a to 6d are connected with the beam member 8 extending along the axis of the crankshaft 2 and the beam member 8 is connected to the central portion 9a of the reinforcing plate member 9 which is coupled with the right and left side skirt portions 15R and 15L of the cylinder block 1, each of the bearing portions 4a to 4d constituted by the bulkheads 5a to 5d and the bearing caps 6a to 6d to support respectively the journals 2Aa to 2Ad of the crankshaft 2 are improved in rigidity in a direction along which the crankshaft 2 extends and improved also in rigidity against twisting distortion thereof in a direction of revolution of the crankshaft 2. As for the bearing portion 4e constituted by the bulkhead 5e and the bearing cap 6e to support the journal 2Ae of the crankshaft 2, the bulkhead 5e is incorporated with the rear wall 22 of the cylinder block 1 to which a rear cover member (not shown in the drawings) is attached and therefore the bearing portion 4e is caused to have sufficient rigidity for retaining firmly the rear end portion 2D of the crankshaft 2. Further, as for the bearing portion 4a constituted by the bulkhead 5a incorporated with the front wall 21 of the cylinder block 1 and the bearing cap 6a to support the journal 2Aa of the crankshaft 2, an oil pump cover 31 of the oil pump 30 and a chain cover 32 adjacent to the oil pump cover 31 are connected through a tubular spacer 33 with the bearing cap 6a by a clamping bolt 34 so as to serve as reinforcements for the bearing cap 6a and therefore the bearing portion 4a is improved more in rigidity for retaining firmly the front end portion 2C of the crankshaft 2. Accordingly undesirable vibrations of each the bearing portions 4a to 4e are suppressed effectively.

Besides, each of the cap bolts 11 for clamping one of the bearing caps 6a to 6e to a corresponding one of the bulkheads 5a to 5e can be made relatively short and therefore each of the bearing caps 6a to 6e can be coupled with the corresponding one of the bulkheads 5a to 5d with sufficient rigidity.

Figure 3:
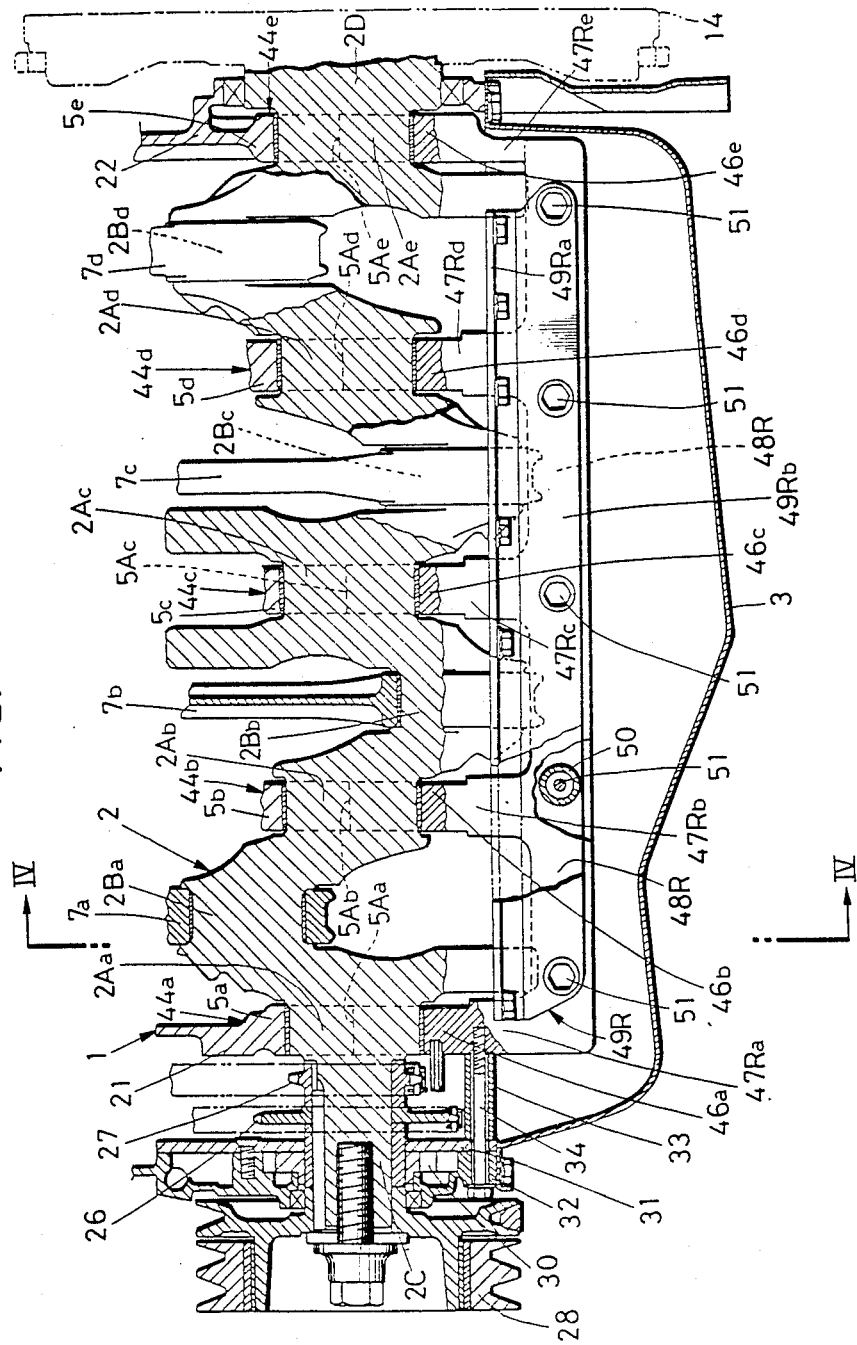
FIGS. 3 and 4 are schematic cross-sectional views each showing another embodiment of arrangement for supporting a crankshaft in a multicylinder engine according to the present invention, together with a part of an engine to which the embodiment is applied.
Figure 4:
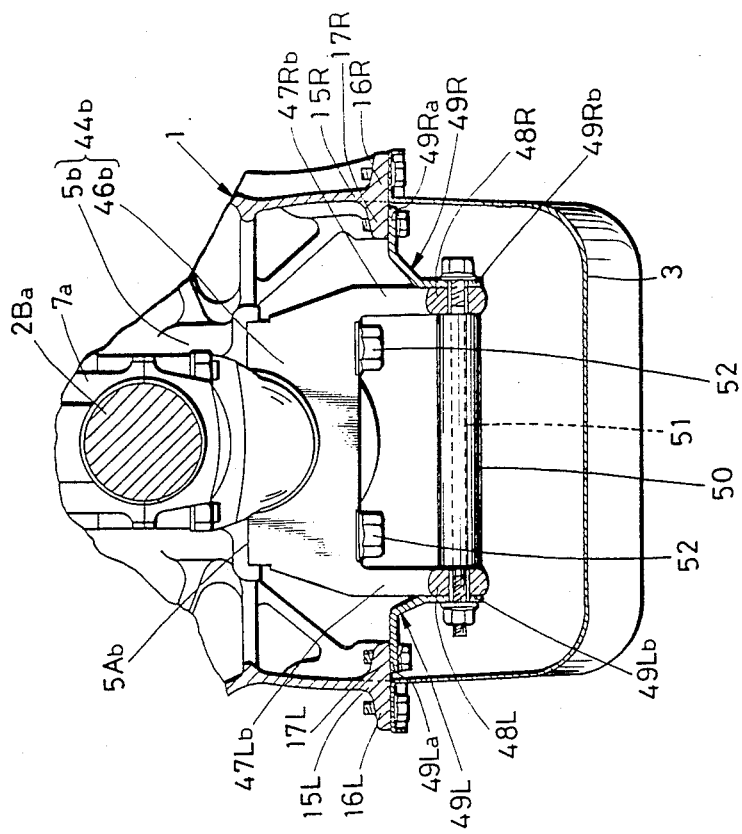

FIGS. 3 and 4 show another embodiment of arrangement for supporting a crankshaft in a multicylinder engine according to the present invention, which is applied to an engine having four cylinders arranged in line. FIG. 4 is a cross-sectional view taken on lines IV—IV in FIG. 3. In FIGS. 3 and 4, elements, members and parts corresponding to those of FIGS. 1 and 2 are marked with the same references and further description thereof will be omitted.

In the embodiment shown in FIGS. 3 and 4, bearing caps 46a, 46b, 46c, 46d and 46e are connected with lower ends 5Aa, 5Ab, 5Ac, 5Ad and 5Ae of bulkheads 5a, 5b, 5c, 5d and 5e, respectively, to constitute bearing portions 44a, 44b, 44c, 44d and 44e by which journals 2Aa, 2Ab, 2Ac, 2Ad and 2Ae of a crankshaft 2 are respectively supported to be rotatable. Each of combinations of the bulkhead 5a and the bearing cap 46a, the bulkhead 5b and the bearing cap 46b, the bulkhead 5c and the bearing cap 46c, the bulkhead 5d and the bearing cap 46d, and the bulkhead 5e and the bearing cap 46e, is clamped by a pair of cap bolts 52 each screwed into each of the bulkheads 5a to 5e through a part of each of the bearing caps 46a to 46e relatively close to the each of the bulkheads 5a to 5e, as shown in FIG. 3.

The bearing caps 46a to 46e are so formed as to have a pair of extended portions 47Ra and 47La, a pair of extended portions 47Rb and 47Lb, a pair of extended portions 47Rd and 47Ld, and a pair of extended portions 47Re and 47Le, respectively. The extended portions 47Ra to 47Re project downward respectively from right side ends of bottom portions of the bearing caps 46a to 46e, and the extended portions 47La to 47Le project downward respectively from left side ends of bottom portions of the bearing caps 46a to 46e, as shown in FIG. 4. Lower ends of the extended portions 47Ra to 47Re are positioned at the outside of a rotation space of the crankshaft 2 and incorporated with a right beam member 48R which extends along an axis of the crankshaft 2, and similarly, lower ends of the extended portions 47La to 47Le are positioned at the outside of the rotation space of the crankshaft 2 and incorporated with a left beam member 48L which extends along the axis of the crankshaft 2 in parallel t the right beam member 48R. That is, the lower ends of each adjacent two of the extended portion 47Ra to 47Re are interconnected through the right beam member 48R which is incorporated with the extended portions 47Ra to 47Re, and the lower ends of each adjacent two of the extended portions 47La to 47Le are interconnected through the left beam member 48L which is incorporated with the extended portions 47La to 47Le.

The right beam member 48R is connected through a reinforcing plate member 49R extending along the right beam member 48R with a right side skirt portion 15R of a cylinder block 1 and the left beam member 48L is connected through a reinforcing plate member 49L extending along the left beam member 48L with a left side skirt portion 15L of the cylinder block 1. Upper ends 49Ra and 49La of the reinforcing plate members 49R and 49L are coupled respectively with inner mounting fringes 17R and 17L provided at lower ends of the right and left side skirt portions 15R and 15L with a plurality of clamping spots arranged along each of the inner mounting fringes 17R and 17L. Lower ends 49Rb and 49Lb of the reinforcing members 49R and 49L are connected respectively with the right and left beam members 48R and 48L with a plurality of clamping spots made by clamping bolt 51. Each of the clamping bolts 51 passes through the lower end 49Rb of the reinforcing plate member 49R, the right beam member 48R, a tubular spacer 50 provided between the right and left beam members 48R and 48L, the left beam member 48L, and the lower end 49Lb of the reinforcing plate member 49L to clamp the lower ends 49Rb and 49Lb of the reinforcing plate members 49R and 49L to the right and left beam members 48R and 48L.

In the embodiment of FIGS. 3 and 4 constituted as mentioned above, since the bearing caps 46a to 46e are connected at the extended portions 47Ra to 47Re and 47L*a* to 47L*e* with the right and left beam members 48R and 48L which are incorporated with the extended portions 47R*a* to 47R*e* and 47L*a* to 47L*e*, respectively, to extend along the axis of the crankshaft 2, and the right and left beam members 48R and 48L are connected through reinforcing plate members 49R and 49L with the right and left side skirt portions 15R and 15L of the cylinder block 1, respectively, each of the bearing portions 44*a* to 44*e* constituted by the bulkheads 5*a* to 5*e* and the bearing caps 46*a* to 46*e* to support respectively journals 2A*a* to 2A*e* of the crankshaft 2 are improved in rigidity in a direction along which the crankshaft 2 extends and improved also in rigidity against twisting distortion thereof in a direction of revolution of the crankshaft 2. Accordingly, undesirable vibrations of each the bearing portions 44*a* to 44*e* are suppressed effectively.

Further, since each of the cap bolts 52 for clamping the bearing caps 46*a* to 46*e* is screwed into one of the bulkheads 5*a* to 5*e* through the part of a corresponding one of the bearing caps 46*a* to 46*e* relatively close to that one of the bulkheads 5*a* to 5*e* and thereby can be made relatively short, each of the bearing caps 46*a* to 46*e* can be coupled with the corresponding one of the bulkheads 5*a* to 5*e* with sufficient rigidity.

Figure 5:
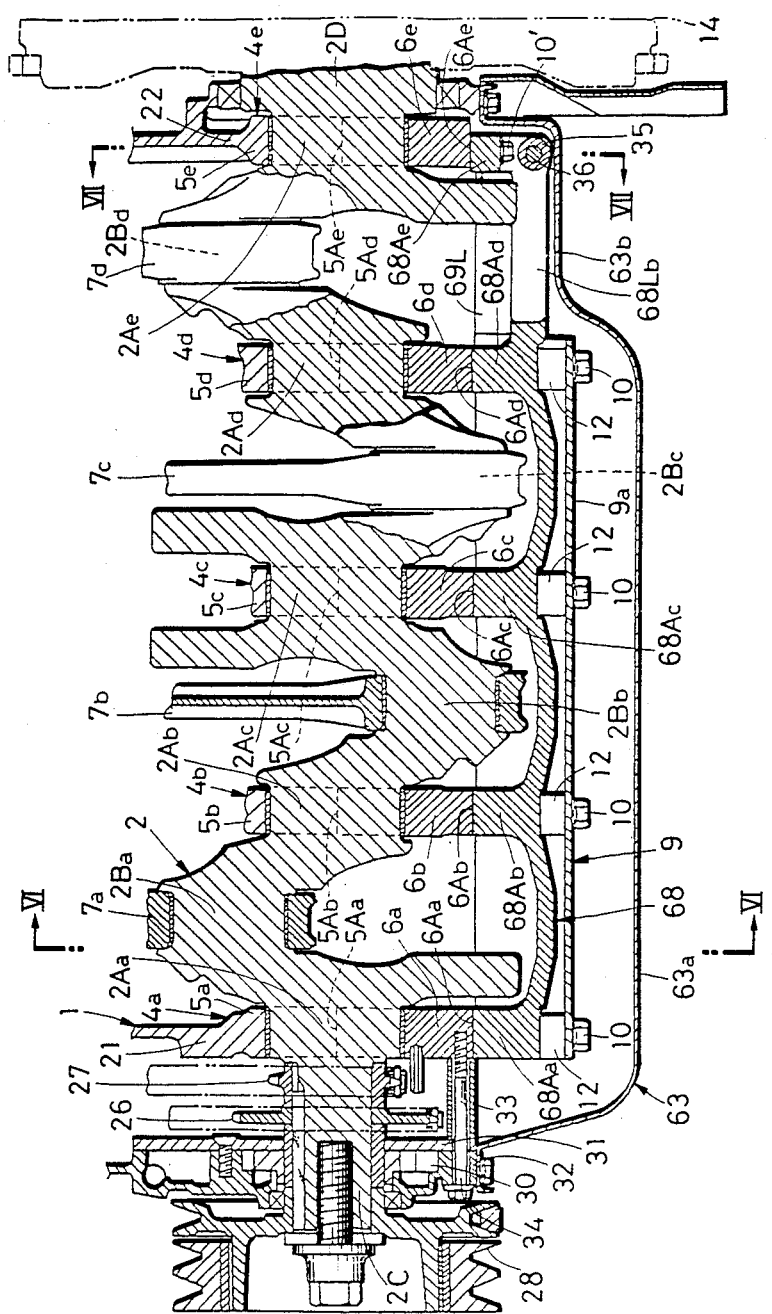

FIGS. 5, 6 and 7 show a further embodiment of arrangement for supporting a crankshaft in a multicylinder engine according to the present invention, which is also applied to an engine having four cylinders arranged in line. FIGS. 6 and 7 are cross-sectional views taken on lines VI—VI and lines VII—VII in FIG. 5. In FIGS. 5, 6 and 7, elements, members and parts corresponding to those of Figs. 1 and 2 are marked with the same references and further description thereof will be omitted.

The engine shown in FIGS. 5, 6 and 7 is provided with an oil pan 63 which has a deep portion 63*a* and a shallow portion 63*b* positioned at the back of the deep portion 63*a* and is coupled with outer mounting fringes 16R and 16L provided at lower ends of right and left side skirt portions 15R and 15L of a cylinder block 1 as shown in FIG. 6. In the cylinder block 1, a beam member 68 which generally extends along an axis of a crankshaft 2 is attached to bearing caps 6*a*, 6*b*, 6*c*, 6*d* and 6*e* which are coupled respectively with lower ends 5A*a*, 5A*b*, 5A*c*, 5A*d* and 5A*e* of bulkheads 5*a*, 5*b*, 5*c*, 5*d* and 5*e* to constitute bearing portions 4*a*, 4*b*, 4*c*, 4*d* and 4*e* for supporting journals 2A*a*, 2A*b*, 2A*c*, 2A*d* and 2A*e* of the crankshaft 2, respectively.

Figure 8:
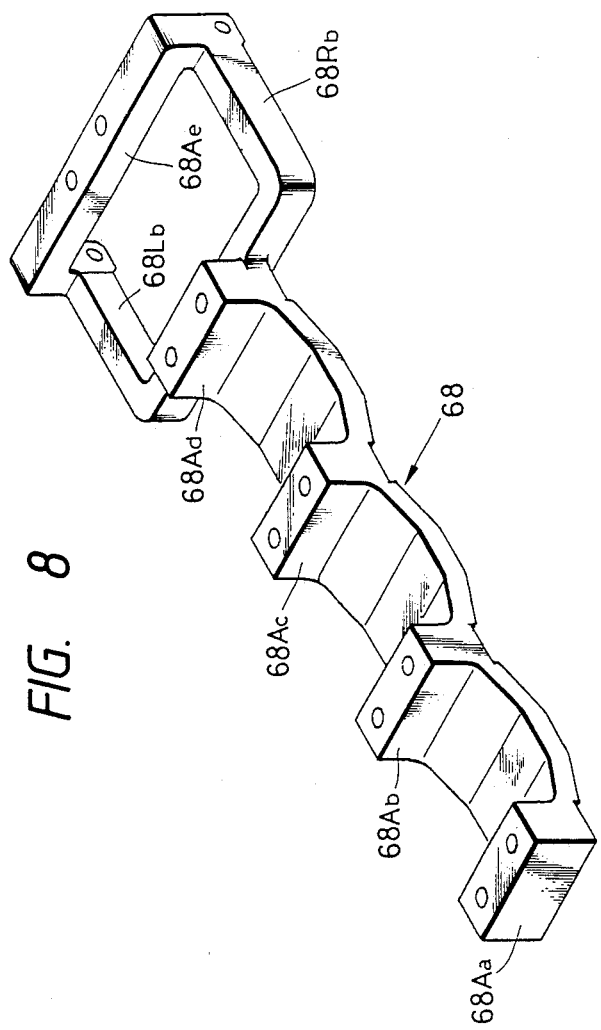
FIG. 8 is a schematic perspective view showing a beam member used in the embodiment shown in FIGS. 5 to 7.

As shown in FIG. 8, the beam member 68 is provided with five connecting projections 68A*a*, 68A*b*, 68A*c*, 68A*d* and 68A*e* arranged to project upward at intervals corresponding to those of the bearing portions 4*a* to 4*e*. The connecting projections 68A*a*, 68A*b*, 68A*c* and 68A*d* are formed in the same shape, while the connecting projection 68A*e* is different in shape from each of the connecting projections 68A*a*, 68A*b*, 68A*c* and 68A*d* and incorporated with forked supports 68L*b* and 68R*b* each extending backward from the connecting projection 68A*d*. This beam member 68 is disposed in such a manner that a first portion thereof including the connecting projections 68A*a*, 68A*b*, 68A*c* and 68A*d* and a second portion thereof including the forked supports 68R*b* and 68L*b* and the connection projection 68A*e* are positioned in the deep portion 63*a* and the shallow portion 63*b* of the oil pan 63, respectively, and the connecting projections 68A*a* to 68A*e* are connected respectively with the lower ends 6A*a* to 6A*e* of the bearing caps 6*a* to 6*e*, as shown in FIG. 5.

Further, a central portion 9*a* of a reinforcing plate member 9 which has right and left fringes 9R and 9L thereof attached to the right and left side skirt portions 15R and 15L of the cylinder block 1 is attached through a plurality of spacers 12 to the under surface of the beam member 68 which is attached to the bearing caps 6*a* to 6*e*. Each of combinations of the bearing cap 6*a* and the connecting projection 68A*a* of the beam member 68, the bearing cap 6*b* and the connecting projection 68A*b* of the beam member 68, the bearing cap 6*c* and the connecting projection 68A*c* of the beam member 68, and the bearing cap 6*d* and the connecting projection 68A*d* of the beam member 68, is clamped by a pair of clamping bolts 10 each screwed into each of the bearing caps 6*a* to 6*d* through the central portion 9*a* of the reinforcing plate member 9, the spacer 12 and each of the connecting projections 68A*a* to 68A*d* of the beam member 68, so that the central portion 9*a* of the reinforcing plate member 9 is coupled with the beam member 68 with a plurality of clamping spots formed by the clamping bolts 10 to be arranged along the beam member 68. In addition, the connecting on 68A*e* of the beam member 68 is clamped to the bearing cap 6*e* by a pair of clamping bolts 10' each screwed into the bearing cap 6*e* through the connecting projection 68A*e*, as shown in FIG. 7.

The forked support 68R*b* of the beam member 68 is connected through a reinforcing plate member 69R with the right side skirt portion 15R of the cylinder block 1, and similarly the forked support 68L*b* of the beam member 68 is connected through a reinforcing plate member 69L with the left side skirt portion 15L of the cylinder block 1. Upper ends of the reinforcing plate members 69R and 69L are coupled respectively with lower ends of the right and left side skirt portions 15R and 15L, and lower ends of the reinforcing plate members 69R and 69L are connected respectively with the forked supports 68R*b* and 68L*b* by a clamping bolt 36, as shown in FIG. 7. The clamping bolt 36 passes through the lower end of the reinforcing plate member 69L, the forked support 68L*b*, a tubular spacer 35 provided between the forked supports 68L*b* and 68R*b*, the forked support 68R*b*, and the lower end of the reinforcing plate member 69R to clamp the lower ends of the reinforcing plate members 69R and 69L to the forked supports 68R*b* and 68L*b*.

In the embodiment of FIGS. 5, 6 and 7 constituted as mentioned above, since the bearing caps 6*a* to 6*e* are connected with the beam member 68 extending along the axis of the crankshaft 2 and the beam member 68 is connected to the reinforcing plate member 9 which is coupled with both the right and left side skirt portions 15R and 15L of the cylinder block 1 and also with the reinforcing plate members 69R and 69L which are coupled respectively with the right nd left side skirt portions 15R and 15L of the cylinder block 1, each of the bearing portions 4*a* to 4*e* constituted by the bulkheads 5*a* to 5*e* and the bearing caps 6*a* to 6*e* to support respectively the journals 2A*a* to 2A*e* of the crankshaft 2 are improved in rigidity in a direction along which the crankshaft 2 extends and improved also in rigidity against twisting distortion thereof in a direction of revolution of the crankshaft 2.

Further, each of the cap bolts 11 for clamping one of the bearing caps 6*a* to 6*e* to a corresponding one of the bulkheads 5*a* to 5*e* can be made relatively short and therefore each of the bearing caps 6*a* to 6*e* can be coupled with the corresponding one of the bulkheads 5*a* to 5*e* with sufficient rigidity.

What is claimed is:

1. An arrangement for supporting a crankshaft in a multicylinder engine comprising:
   a plurality of bulkheads provided in a cylinder block of the engine to be arranged at predetermined intervals along an axis of the crankshaft disposed in a lower part of the cylinder block,
   a plurality of bearing caps each coupled with a lower end of one of the bulkheads by a cap bolt screwed into the bulkhead through a part of the bearing cap so as to constitute a bearing portion for supporting the crankshaft in conjunction with the bulkhead,
   a beam structure extending along the axis of the crankshaft to interconnect therethrough adjacent two of the bearing caps, and
   a reinforcing structure coupled with the beam structure with a plurality of clamped spots generally arranged in the direction along which the crankshaft extends and also coupled with each of side skirt portions of the cylinder block with a plurality of clamped spots generally arranged in the direction along which the crankshaft extends.

2. An arrangement according to claim 1, wherein said beam structure is disposed between (a) each of the bearing caps and (b) the reinforcing structure and wherein each of the bearing caps is so formed as to have a lower end thereof disposed above lower end faces of the side skirt portions of the cylinder block.

3. An arrangement according to claim 2, wherein said reinforcing structure is shaped into a plate having opposite fringe portions each extending along the axis of the crankshaft to be coupled with lower ends of the side skirt portions of the cylinder block respectively and protruding downward so as to be positioned at the outside of a revolution space of the crankshaft and coupled at a central portion thereof with the bearing caps through the beam structure.

4. An arrangement according to claim 3, wherein said beam structure is attached to a lower end of each of the bearing caps where said lower end is positioned beneath the part of each of the bearing caps through which the cap bolt passes, and wherein (a) the bearing cap, (b) the beam structure attached to the lower end of the bearing cap, and (c) the central portion of the reinforcing structure are clamped by a clamping bolt screwed into the bearing cap through the central portion of the reinforcing structure, a spacer being disposed between the beam structure and the reinforcing structure.

5. An arrangement according to claim 4, wherein said beam structure is provided with a plurality of connecting projections arranged to project upward at predetermined intervals for connecting with the lower ends of the bearing caps respectively.

6. An arrangement according to claim 5, wherein one of the bearing caps which is coupled with one of the bulkheads incorporated with a front wall of the cylinder block, is connected through a spacer with at least one cover members disposed in front of the cylinder block.

7. An arrangement according to claim 3, wherein each of the bearing caps is coupled with the corresponding one of the bulkheads by a pair of cap bolts, the beam structure is connected with each of the bearing caps at a position thereon under a portion of each of the bearing caps between the cap bolts, and a side wall portion between one of the reinforcing structure is disposed outside of the cap bolts.

8. An arrangement according to claim 2, wherein said beam structure is provided with a plurality of connecting projections arranged to project upward at predetermined intervals for connecting with the bearing caps respectively.

9. An arrangement according to claim 2, wherein said beam structure is provided with a plurality of first connecting projections arranged to project upward at predetermined intervals for connecting with the bearing caps positioned above a deep portion of an oil pan provided under the cylinder block and further with at least one second connecting projection formed to project upward from forked supports each extending from one of the first connecting projections for connecting with the bearing cap positioned above a shallow portion of the oil pan.

10. An arrangement according to claim 9, wherein said beam structure is formed in a body and separated from the bearing caps, and each of the bearing caps is so formed as to have a lower end thereof prevented from projecting downward from lower end faces of side skirt portions of the cylinder block.

11. An arrangement according to claim 10, wherein one of the bearing caps which is coupled with one of the bulkheads incorporated with a front wall of the cylinder block, is connected through a spacer with at least one cover members disposed in front of the cylinder block.

12. An arrangement according to claim 9, wherein said reinforcing structure comprises a first reinforcing member extending along the axis of the crankshaft and having one end connected with the first beam member of the beam structure and the other end connected to one of the side skirt portions of the cylinder block and a second reinforcing member extending along the axis of the crankshaft and having one end connected with the second beam member of the beam structure and the other end connected to the other of the side skirt portions of the cylinder block.

13. An arrangement according to claim 1, wherein each of the bearing caps is so formed as to have first and second extended portions projecting downward from opposite ends thereof to face each other with the cap bolt between, and low ends of said first extended portions of the bearing caps and low ends of said second extended portions of the bearing caps are incorporated respectively with first and second beam members of said beam structure each extending along the axis of the crankshaft and further connected through the reinforcing structure with the side skirt portions of the cylinder block.

14. An arrangement according to claim 13, wherein said first and second beam members of the beam structure are interconnected through a spacer.

15. An arrangement for supporting a crankshaft in a multicylinder engine comprising:
   a plurality of bulkheads provided in a cylinder block of the engine to be arranged at predetermined intervals along an axis of the crankshaft disposed in a lower part of the cylinder block,
   a plurality of bearing caps each coupled with a lower end of one of the bulkheads by a cap bolt screwed into the bulkhead through a part of the bearing cap relatively close to the bulkhead so as to constitute a bearing portion for supporting the crankshaft in conjunction with the bulkhead, each of said bearing caps being so formed as to have first and second extended portions projecting downward from opposite ends thereof to face each other with the cap bolt between and low ends of said first extended portions of the bearing caps, a first beam member incorporated with lower ends of said first extended portions of the bearing caps to extend along the axis of the crankshaft, a second beam member incorporated with lower ends of said second extended portions of the bearing caps to extend along the axis of the crankshaft, and a reinforcing structure for connecting the first and second beam members with side skirt portions of the cylinder block respectively.

16. An arrangement according to claim 15, wherein said reinforcing structure comprises a first reinforcing member extending along the axis of the crankshaft and having one end connected with the first beam member and the other end connected to one of the side skirt portions of the cylinder block and a second reinforcing member extending along the axis of the crankshaft and having one end connected with the second beam member structure and the other end connected to the other of the side skirt portions of the cylinder block.

* * * * *